US012052643B2

(12) United States Patent
Vamanan et al.

(10) Patent No.: US 12,052,643 B2
(45) Date of Patent: Jul. 30, 2024

(54) PUBLIC LAND MOBILE NETWORK SELECTION FOR DISASTER ROAMING

(71) Applicant: Apple Inc., Cupertino, CA (US)

(72) Inventors: Sudeep Manithara Vamanan, Nuremberg (DE); Robert Zaus, Munich (DE); Haijing Hu, Los Gatos, CA (US); Krisztian Kiss, Hayward, CA (US); Roland Gruber, Sauerlach (DE)

(73) Assignee: Apple Inc., Cupertino, CA (US)

( * ) Notice: Subject to any disclaimer, the term of this patent is extended or adjusted under 35 U.S.C. 154(b) by 51 days.

(21) Appl. No.: 17/554,674

(22) Filed: Dec. 17, 2021

(65) Prior Publication Data

US 2022/0264275 A1    Aug. 18, 2022

Related U.S. Application Data

(60) Provisional application No. 63/150,446, filed on Feb. 17, 2021.

(51) Int. Cl.
*H04W 4/90* (2018.01)
*H04W 8/12* (2009.01)
(Continued)

(52) U.S. Cl.
CPC ............. *H04W 4/90* (2018.02); *H04W 8/12* (2013.01); *H04W 48/20* (2013.01); *H04W 84/042* (2013.01)

(58) Field of Classification Search
CPC ............................ H04W 48/02; H04W 60/00
(Continued)

(56) References Cited

U.S. PATENT DOCUMENTS

2011/0263252 A1* 10/2011 Saini ............... H04W 48/16
455/434
2013/0109377 A1    5/2013 Al-Khudairi et al.
(Continued)

FOREIGN PATENT DOCUMENTS

| CN | 104285474 A | 1/2015 |
| CN | 105247931 A | 1/2016 |
| WO | WO 2020141964 A1 | 7/2020 |

OTHER PUBLICATIONS

3GPP, "3GPP TS 23.122 V16.11.0 (Sep. 2021)—Technical Specification: 3rd Generation Partnership Project; Technical Specification Group Core Network and Terminals; Non-Access-Stratum (NAS) functions related to Mobile Station (MS) in idle mode (Release 16)," Sophia Antipolis Valbonne, France, Sep. 24, 2021, 82 pages.
3GPP, "3GPP TS 23.501 V16.10.0 (Sep. 2021)—Technical Specification: 3rd Generation Partnership Project; Technical Specification Group Services and System Aspects; System architecture for the 5G System (5GS); Stage 2 (Release 16)," Sophia Antipolis Valbonne, France, Sep. 24, 2021, 453 pages.
(Continued)

*Primary Examiner* — Kiet M Doan
(74) *Attorney, Agent, or Firm* — Sterne, Kessler, Goldstein & Fox P.L.L.C.

(57) ABSTRACT

Some embodiments include an apparatus, method, and computer program product for public land mobile network (PLMN) selection for disaster roaming in a 5G wireless communications system. A user equipment (UE) can receive two or more messages that disaster roaming service is offered by two or more forbidden public land mobile networks (PLMNs) of a forbidden PLMN list of the UE. The UE can select a first forbidden PLMN of the two or more forbidden PLMNs, where the first forbidden PLMN corresponds to a highest priority PLMN of a preferred PLMN list of the UE, and establish communications, via the transceiver, with the first forbidden PLMN. Some embodiments include designating a forbidden PLMN as offering a disaster roaming PLMN for manual selection. Some embodiments include enabling a Closed Access Group (CAG)-capable UE (Continued)

to access disaster roaming services from a forbidden PLMN of a CAG-only cell or a 5G cell.

18 Claims, 7 Drawing Sheets

(51) Int. Cl.
*H04W 48/20* (2009.01)
*H04W 84/04* (2009.01)

(58) Field of Classification Search
USPC ............................. 455/436, 435.1; 370/329
See application file for complete search history.

(56) References Cited

U.S. PATENT DOCUMENTS

| 2014/0357285 | A1 | 12/2014 | Smith et al. | |
|---|---|---|---|---|
| 2022/0070815 | A1* | 3/2022 | Chun | H04W 4/90 |
| 2022/0086743 | A1* | 3/2022 | Chun | H04W 48/18 |

OTHER PUBLICATIONS

Chinese Office Action and Search Report directed to related Chinese Application No. 202210106503.1, with English-language translation of the Search Report attached, mailed Dec. 28, 2023; 11 pages.

Ericsson, "MINT: solution for How can UE/subscribers perform network selection for disaster roaming?" 3GPP TSG-CT WG1 Meeting #126-e Electronic meeting; Oct. 15-23, 2020, C1-207328; 1 page.

Qualcomm Incorporated, "Solution to MINT Key Issue #5 (PLMN selection when a "Disaster Condition" applies)," 3GPP TSG-CT WG1 Meeting #127bis-e Electronic meeting; Jan. 25-29, 2021, C1-210115; 6 pages.

LG Electronics, "New solution to KI#5: Handling of forbidden PLMN list," 3GPP TSG-CT WG1 Meeting #127bis-e Electronic meeting; Jan. 25-29, 2021, C1-210222; 4 pages.

Qin et al., "Research on LTE International Roaming Service Strategy," with English-language abstract on the face page of the document, Feb. 15, 2016; 5 pages.

* cited by examiner

PUBLIC LAND MOBILE NETWORK SELECTION FOR DISASTER ROAMING

CROSS-REFERENCE TO RELATED APPLICATION

This application claims benefit of U.S. Provisional Patent Application No. 63/150,446, filed on Feb. 17, 2021, which is incorporated herein by reference in its entirety.

BACKGROUND

Field

The embodiments relate generally to wireless devices, including apparatus, systems, computer program products, and methods for selecting public land mobile networks (PLMNs) for disaster roaming in a wireless communication system.

Related Art

New Radio systems (e.g., 3rd Generation Partnership Project (3GPP) fifth generation (5G) systems) emphasize high reliability, low latency and high availability of communication services. To support these systems, interruption of communication services in one network should be reduced to reduce the time when the users are out of communication services, and reduce additional impact to neighboring networks. For example, the techniques may include various mechanisms for indicating when a disaster condition is affecting the home network of a wireless device, potentially both for indicating cells of the home network that are not currently available due to the disaster condition, and for indicating cells that are temporarily accepting inbound disaster roaming wireless devices. The disaster condition may include an outage for at least a portion of the core network and/or radio access network of the home network of the wireless device.

SUMMARY

Some embodiments include an apparatus, method, and computer program product for public land mobile network (PLMN) selection for disaster roaming. Some embodiments include a user equipment (UE), configured to operate in a wireless network (e.g., a 5G New Radio wireless network.) The UE can include a transceiver configured to operate in a wireless network and a processor coupled to the transceiver. When a home PLMN and/or a preferred PLMN is not available, the UE can receive, via the transceiver, two or more messages that disaster roaming service is offered by two or more forbidden PLMNs of a forbidden PLMN list of the UE, and the UE can choose one of the forbidden PLMNs based on a relative priority. For, example, the UE can select a first forbidden PLMN of the two or more forbidden PLMNs, where the first forbidden PLMN corresponds to a highest (or higher) priority PLMN of a preferred PLMN list of the UE, and establish communications, via the transceiver, with the first forbidden PLMN. Where a second forbidden PLMN of the two or more forbidden PLMNs also corresponds to the highest priority PLMN of a preferred PLMN list of the UE device, the selection of the first forbidden PLMN can be based at least on a Receive Signal Strength Indication (RSSI) or a random selection. The preferred PLMN list of the UE device can include: a user controlled PLMN list or an operator controlled PLMN list.

Some embodiments include a non-transitory computer-readable medium storing instructions that, when executed by a processor of an electronic device (e.g., UE device), cause the processor to perform operations including receiving from a first PLMN of a forbidden PLMN list of the electronic device, a first message that disaster roaming service is offered corresponding to a first PLMN. The operations include determining based at least on the first message, that the first PLMN corresponds to a home PLMN of the electronic device, sending first message information to upper layers, and subsequent to the sending, presenting the first forbidden PLMN as a first designated disaster roaming PLMN. The presenting includes suppressing a forbidden status indication of the first forbidden PLMN, or displaying the first forbidden PLMN as being available for disaster roaming service. The operations also include receiving a selection of the first designated disaster roaming PLMN, and establishing communications with the first designated disaster roaming PLMN.

In some embodiments, the operations also include receiving from a second forbidden PLMN of the forbidden PLMN list of the electronic device, a second message that disaster roaming service is offered for a third PLMN and determining based at least on the second message, that the third PLMN is not: the home PLMN; in the forbidden PLMN list; or in a wireless system forbidden tracking area. The operations include sending second message information to upper layers, and subsequent to the sending, presenting the second forbidden PLMN as a second designated disaster roaming PLMN. The presenting includes suppressing a forbidden status indication of the second forbidden PLMN, or displaying the second forbidden PLMN as being available for disaster roaming service.

Some embodiments include a method for a Closed Access Group (CAG)-capable UE device that includes receiving from a first forbidden PLMN of a forbidden PLMN list of the CAG-capable UE device, a first message that disaster roaming service is offered corresponding to a first PLMN. The method includes determining that the first PLMN is a home PLMN or that the first PLMN is not in the forbidden list of the CAG-capable UE, and selecting the first forbidden PLMN for disaster roaming service. When the first message includes: a cellReservedforOtherUse=False and a CAG-ID, the selecting includes disregarding the CAG-ID. Where the first message includes a cellReservedforOtherUse=True and a CAG-ID, the selecting includes disregarding the cellReservedforOtherUse=True and the CAG-ID.

In some embodiments, the method also includes storing disaster assistance information, and receiving from a CAG-only cell of a second forbidden PLMN of the forbidden PLMN list of the CAG-capable UE device, a second message that disaster roaming service is offered corresponding to a second PLMN. The method includes determining that the second message satisfies the disaster assistance information. Where the disaster assistance information includes a PLMN ID and a CAG-ID, the determining the satisfaction includes determining that values in the second message substantially match the PLMN ID and the CAG-ID. Subsequent to the determining the satisfaction, the method includes selecting the second forbidden PLMN for disaster roaming service, and establishing communications with the second forbidden PLMN via the CAG-only cell.

Some embodiments include a 5G Node B (gNB) including a transceiver configured to operate in a CAG of a PLMN, and a processor coupled to the transceiver. The gNB can transmit, via the transceiver, a disaster roaming message including: the PLMN of the gNB, a CAG-ID, and a first PLMN for which disaster roaming service is offered. The gNB can establish, via the transceiver, communications with a CAG-capable UE via the PLMN of the gNB and the CAG-ID.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

A wireless device (e.g., a user equipment (UE)) receiving information relating to a disaster condition may make use of the information to perform searches for public land mobile networks (PLMNs) including one or more forbidden PLMNs that would normally be inaccessible, for temporarily providing disaster roaming service. The wireless device can register with and obtain disaster roaming service from a forbidden PLMN while the home network or the preferred network of the wireless device is unable to provide normal service to the wireless device.

Figure 1:
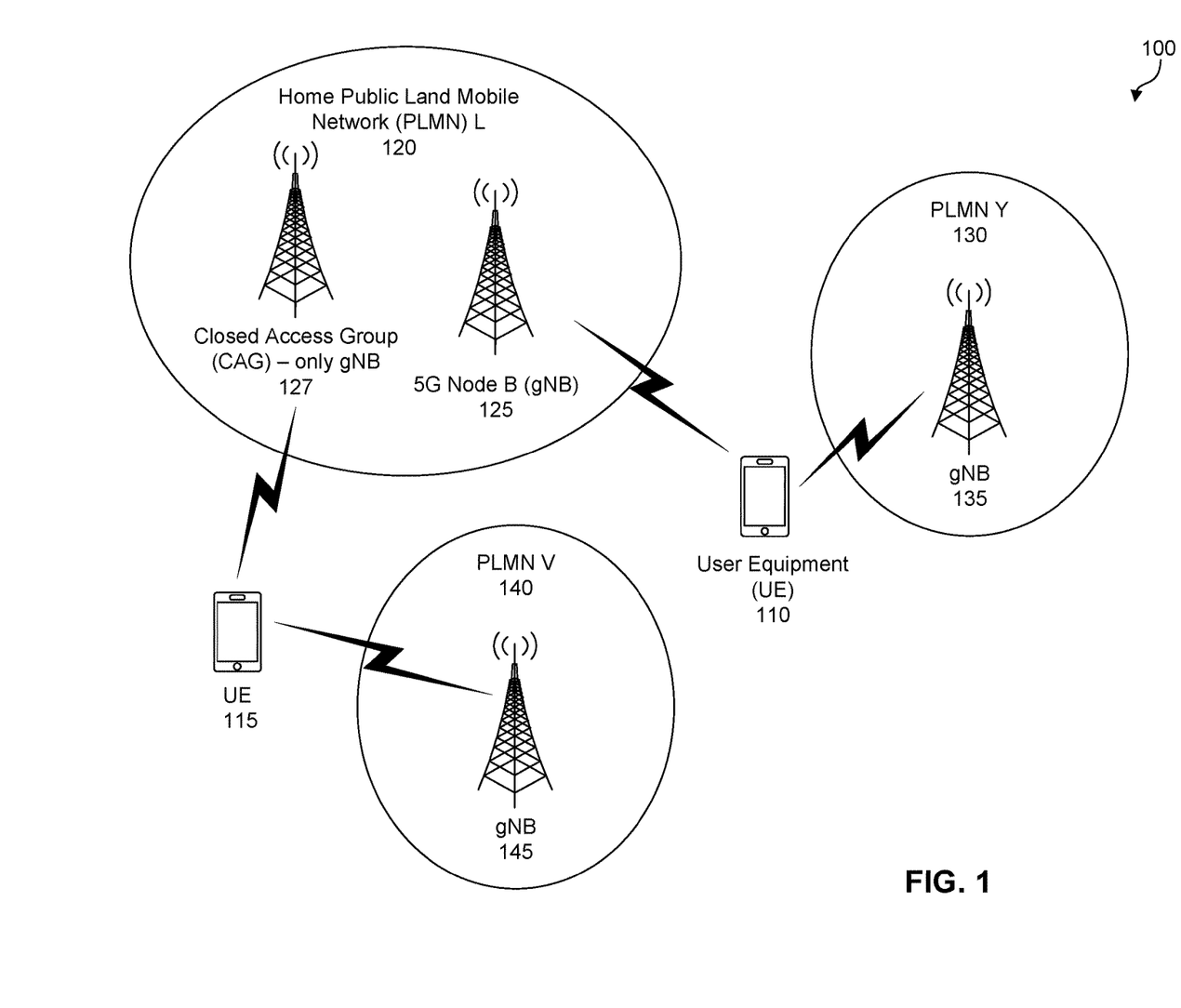
FIG. 1 illustrates an example system for Public Land Mobile Network (PLMN) selection for disaster roaming, in accordance with some embodiments of the disclosure.

FIG. 1 illustrates example system 100 for PLMN selection for disaster roaming, in accordance with some embodiments of the disclosure. System 100 may include home PLMN L 120, PLMN V 140, and PLMN Y 130. Home PLMN L 120 can include one or more 5G node Bs (gNBs) that provides wireless service such as 5G radio access. For example, gNB 125 can serve UE 110, and gNB 127 can serve Closed Access Group (CAG)-only cells for CAG-capable devices like UE 115. PLMN Y 130 can include gNB 135, and PLMN V 140 can include gNB 145.

Figure 2:
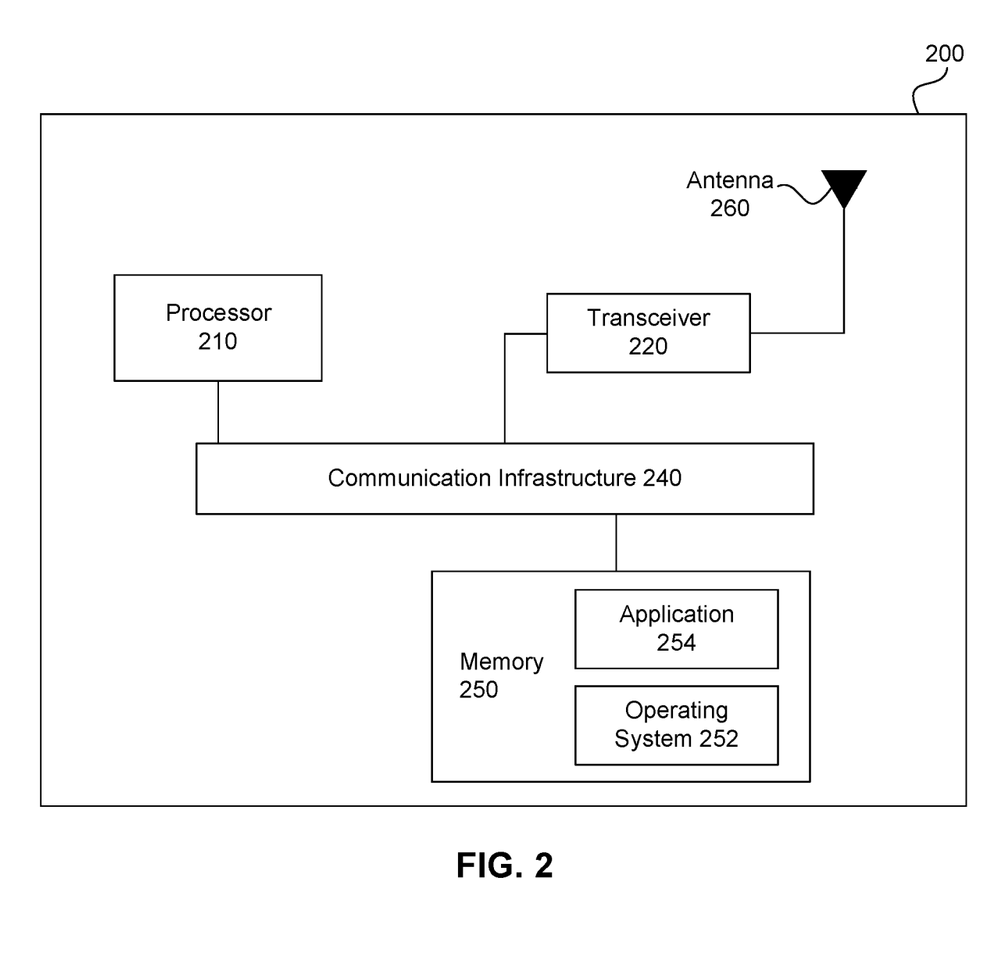
FIG. 2 illustrates a block diagram of an example wireless system for PLMN selection for disaster roaming, according to some embodiments of the disclosure.

FIG. 2 illustrates a block diagram of an example wireless system 200 supporting PLMN selection for disaster roaming, according to some embodiments of the disclosure. As a convenience and not a limitation, system 200, can be described with elements of FIG. 1. System 200 can be any of the electronic devices (e.g., UE 110, UE 115, gNB 125, gNB 127, gNB 135, gNB 145) of system 100. System 200 includes a processor 210, one or more transceivers 220, communication infrastructure 240, memory 250, operating system 252, application 254, and one or more antennas 260. Illustrated systems are provided as exemplary parts of system 200, and system 200 can include other circuit(s) and subsystem(s). Although the systems of system 200 are illustrated as separate components, the aspects of this disclosure can include any combination of these, less, or more components.

Memory 250 can include random access memory (RAM) and/or cache, and can include control logic (e.g., computer software) and/or data. Memory 250 can include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, displaying available PLMN networks and/or other user applications. PLMN networks displayed can include home PLMN L 120, preferred PLMNs that include user controlled PLMN lists and operator controlled PLMN lists, and forbidden PLMN lists. In the event of a disaster and PLMN L 120 is not available, the preferred PLMNs may provide disaster roaming service to UE 110 and/or UE 115 that consider PLMN L 120 a home PLMN. When the preferred PLMNs are also not available, one or more forbidden PLMNs offering disaster roaming may be considered as a lowest priority during a PLMN selection.

Processor 210 together with instructions stored in memory 250 performs operations enabling system 200 to implement mechanisms supporting PLMN selection for disaster roaming. For example, when system 200 is a UE device like UE 110 and/or UE 115, Application 254 can include functions for: Automatic PLMN selection among forbidden PLMNs of a forbidden PLMN list offering disaster roaming services; presenting one or more forbidden PLMNs of a forbidden PLMN list as being available for selection for disaster roaming service; and enabling a CAG-capable device to select a forbidden PLMN of a forbidden PLMN list to access disaster roaming service. When system 200 is a gNB device like gNB 125, 127, 135, or 145, application 254 can include functions for broadcasting disaster roaming service messages, including CAG cell broadcasts.

System 200 can also include communication infrastructure 240. Communication infrastructure 240 provides communication between, for example, processor 210, one or more transceivers 220, and memory 250. In some implementations, communication infrastructure 240 may be a bus. One or more transceivers 220 transmit and receive communications signals that support mechanisms for PLMN selection for disaster roaming. According to some aspects, one or more transceivers 220 may be coupled to antenna 260. Antenna 260 may include one or more antennas that may be the same or different types. One or more transceivers 220 allow system 200 to communicate with other devices that may be wired and/or wireless. In some examples, one or more transceivers 220 can include processors, controllers, radios, sockets, plugs, buffers, and like circuits/devices used for connecting to and communication on networks. According to some examples, one or more transceivers 220 include one or more circuits to connect to and communicate on wired and/or wireless networks.

According to some aspects of this disclosure, one or more transceivers 220 can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220 can include more or fewer systems for communicating with other devices. In some examples, one or more transceivers 220 can include one or more circuits (including a WLAN transceiver) to enable connection(s) and communication over WLAN networks such as, but not limited to, networks based on standards described in IEEE 802.11. Additionally, or alternatively, one or more transceivers 220 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, one or more transceivers transceiver 620 can include a Bluetooth™ transceiver.

Additionally, one or more transceivers 220 can include one or more circuits (including a cellular transceiver) for connecting to and communicating on cellular networks. The cellular networks can include, but are not limited to, 3G/4G/5G networks such as Universal Mobile Telecommunications System (UMTS), Long-Term Evolution (LTE), mmWave systems, and the like. For example, one or more transceivers 220 can be configured to operate according to one or more of Rel-15, Rel-16, Rel-17, or other present/future 3GPP standards.

According to some aspects of this disclosure, processor 210, alone or in combination with computer instructions stored within memory 250, and/or one or more transceiver 220, implements the methods and mechanisms discussed in this disclosure. For example, processor 210, alone or in combination with computer instructions stored within memory 250, and/or one or more transceiver 220, implements mechanisms supporting PLMN selection for disaster roaming as shown in FIG. 1. In some embodiments, processor 210 can include its own internal memory (not shown), and/or be "hard-wired" (as in a state-machine) configured to enable PLMN selection for disaster roaming.

Figure 3:
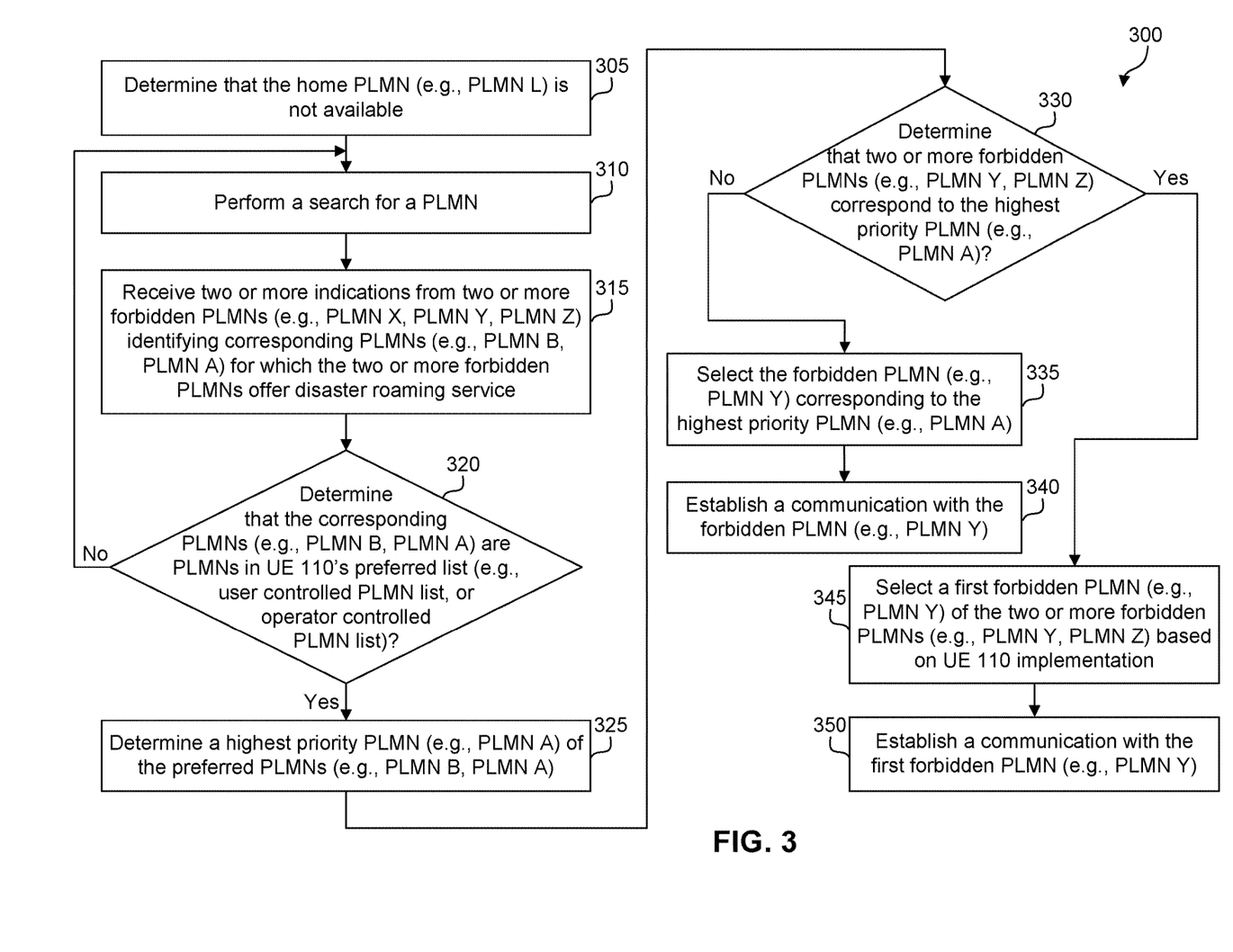
FIG. 3 illustrates an example method for a user equipment (UE) supporting automatic PLMN selection for disaster roaming, according to some embodiments of the disclosure.

FIG. 3 illustrates method 300 for a UE supporting automatic PLMN selection for disaster roaming, according to some embodiments of the disclosure. As a convenience and not a limitation, method 300, can be described with elements of FIGS. 1 and 2. For example, method 300 can be performed by UE 110 or UE 115 of FIG. 1, or processor 210 of system 200 of FIG. 2 that executes instructions stored in memory 250.

UE 110 selects a PLMN by considering an ordered list of priorities: a home PLMN, user preferred PLMN list, and an operator preferred PLMN list. UE 110 also has a forbidden PLMN list that is normally not accessible to UE 110. For example, an operator of a forbidden PLMN and an operator of the home PLMN of UE 110 may not have a service agreement in place that allows UE 110 to operate on the forbidden PLMN. The highest preferred PLMN is the home PLMN followed by preferred PLMNs in an ordered list.

A cellular base station (e.g., gNB 125) may provide an indication to a wireless device (e.g., UE 110) that a disaster condition is in effect. The disaster condition may affect a home PLMN L 120 of the wireless device (e.g., UE 110). The indication of the disaster condition may be provided in any of various ways, from any of various sources. In some instances, multiple types of indication of a disaster condition can be provided to the wireless device (e.g., UE 110).

For example, the indication of the disaster condition may include an indication to activate disaster roaming that is provided in a radio resource control (RRC) release message. For example, if the disaster condition affects a core network entity or entities of the home PLMN L 120 of the UE 110 such that a cell provided by gNB 125 with which UE 110 has established a RRC connection is partially or entirely unable to access or obtain normal service from the core network of PLMN L 120, the cell may release the RRC connection with cause information indicating to UE 110 to activate disaster roaming. Subsequent to receiving the information, UE 110 can perform a search for a PLMN. Note that gNB 125 providing the cell can be informed of the core network outage (e.g., via an indication from an operation and management function of PLMN L 120), and/or for gNB 125 to autonomously determine that the core network outage is occurring, in various scenarios.

When a home PLMN is not available, UE 110 follows the ordered list of prioritized PLMNs to select a PLMN. For example, a PLMN cell in a non-home PLMN may still be capable of providing service in a region in which the home PLMN is unavailable due to a disaster condition (e.g., a failure in radio access network). In such a scenario, the non-home PLMN cell can provide a message indicating that disaster roaming is allowed on the non-home PLMN cell. The message can include an indication that disaster roaming is allowed on the PLMN cell, such as 1 bit indicating a True or False value to indicate that the PLMN cell is available or not available for disaster roaming. In addition, the message that disaster roaming is allowed on the non-home PLMN cell may include any amount and/or type of additional information, such as a list of PLMNs for which disaster roaming is allowed. The information in the message can allow UE 110 to determine whether to consider the non-home PLMN cell for possible cell selection for disaster roaming.

In some embodiments, in addition to the PLMNs in the user preferred PLMN list and/or the operator preferred PLMN list, two or more of the forbidden PLMNs of the forbidden PLMN list may offer disaster roaming to UE 110. UE 110 can select among the two or more of the forbidden PLMNs offering disaster roaming based on a relative priority of the ordered list of prioritized PLMNs starting with, for example, the highest (or higher) priority preferred PLMN for disaster roaming.

In method 300 for example, UE 110 is configured as follows: UE 110's home PLMN is PLMN L 120, and UE 110 has an operator preferred list that includes an ordered pair: {PLMN A, PLMN B} (not shown). Based on a relative priority, PLMN A, for example has a highest priority or higher priority than PLMN B. UE 110 has a list of forbidden PLMNs either present in the forbidden PLMN list or in the list of 5GS forbidden tracking areas for roaming that include {PLMN X, PLMN Y, and PLMN Z}. Further, operators of PLMN A and PLMN Y have established service agreements where PLMN Y provides disaster roaming service for UEs (e.g., UE 110) associated with PLMN A. Further, operators of PLMN B and PLMN X have established service agreements where PLMN X provides disaster roaming service for UEs (e.g., UE 110) associated with PLMN B. In some examples, the agreements established by operators associated with ordered pair of PLMNs include service agreements to provide reciprocal disaster roaming in the event of a disaster.

At 305, UE 110 determines that the home PLMN (e.g., PLMN L) is not available.

At 310, UE 110 performs a search for a PLMN.

At 315, UE 110 receives two or more indications from two or more forbidden PLMNs (e.g., PLMN X, PLMN Y, PLMN Z) identifying corresponding PLMNs (e.g., PLMN A, PLMN B) for which the two or more forbidden PLMNs offer disaster roaming service.

At 320, UE 110 determines whether the corresponding PLMNs (e.g., PLMN A, PLMN B) are PLMNs in UE 110's preferred PLMN list (e.g., user controlled PLMN list, or operator controlled PLMN list). When UE 110 determines that the corresponding PLMNs (e.g., PLMN A and PLMN B) are in UE 110's preferred PLMN list, method 300 proceeds to 325. Otherwise, method 300 returns to 310 to perform another search for a PLMN.

At 325, UE 110 determines a relative priority of a PLMN such as a higher or highest highest priority PLMN (e.g., PLMN A) of the preferred PLMNs (e.g., PLMN A, PLMN B).

At 330, UE 110 determines whether two or more forbidden PLMNs (e.g., PLMN X, PLMN Y, PLMN Z) correspond to the highest priority PLMN (e.g., PLMN A). When both PLMN Y and PLMN Z correspond to the PLMN A, method 300 proceeds to 345. Otherwise, if only one of the forbidden PLMNs (e.g., PLMN Y) corresponds to the PLMN A, then method 300 proceeds to 335.

At 335, UE 110 selects the forbidden PLMN (e.g., PLMN Y) corresponding to the highest priority PLMN (e.g., PLMN A), because a service agreement established allows PLMN Y to provide disaster roaming service to wireless devices operating in PLMN A.

At 340, UE 110 establishes a communication with the forbidden PLMN (e.g., PLMN Y.)

At 345, when both PLMN Y and PLMN Z correspond to the highest priority PLMN (e.g., PLMN A), UE 110 selects a first forbidden PLMN (e.g., PLMN Y) of the two or more forbidden PLMNs (e.g., PLMN Y, PLMN Z) based on UE 110 implementation. For example, UE 110 can select PLMN Y based on a highest received signal strength indication (RSSI) or UE 110 can make a random selection between PLMN Y and PLMN Z. The random selection can be based for example, on prior knowledge of the preferred PLMNs, PLMN Y and/or PLMN Z.

At 350, UE 110 establishes a communication with the first forbidden PLMN (e.g., PLMN Y) for disaster roaming.

Figure 4:
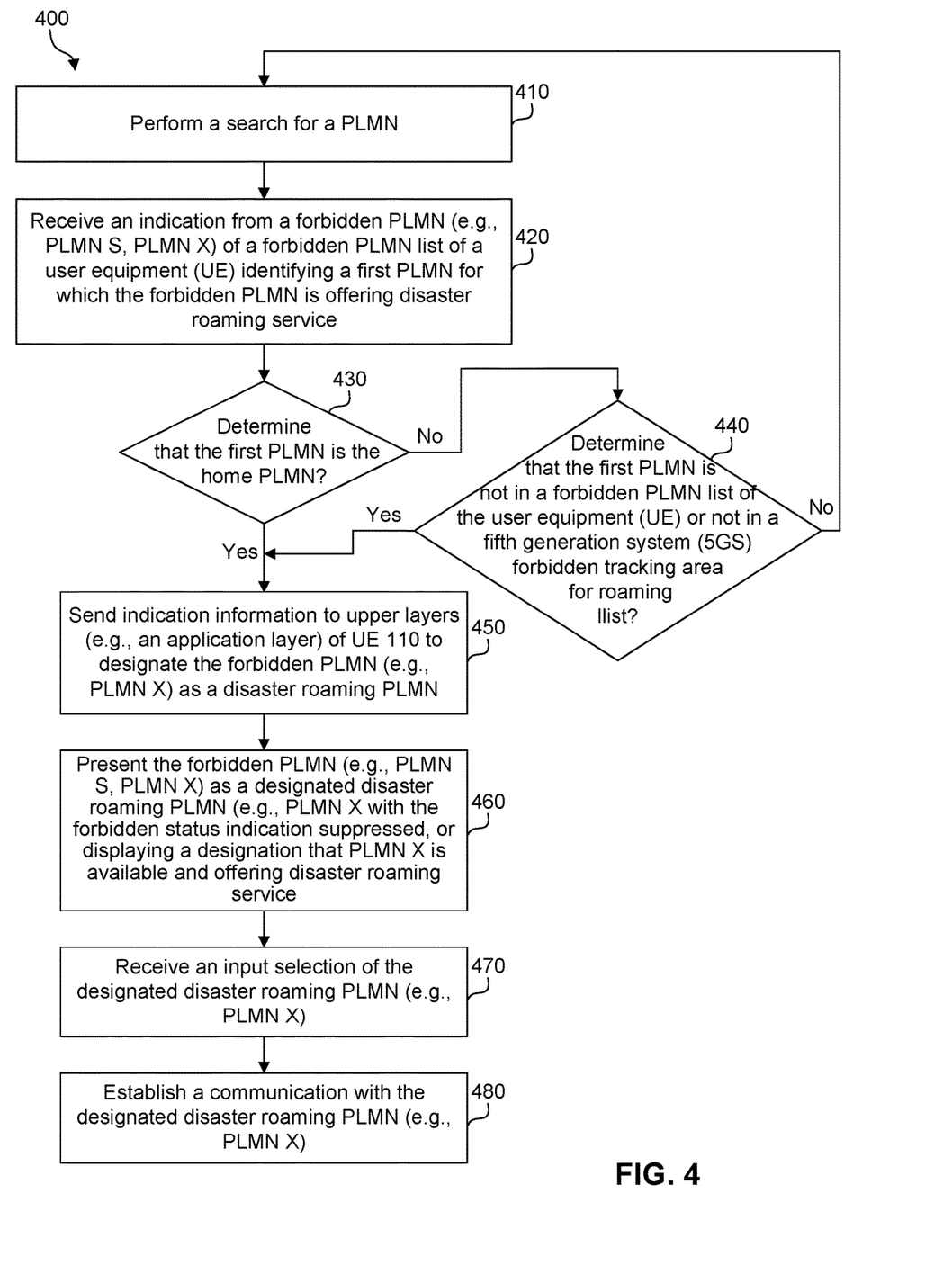
FIG. 4 illustrates an example method for a UE supporting manual PLMN selection for disaster roaming, according to some embodiments of the disclosure.

FIG. 4 illustrates method 400 for a UE device supporting manual PLMN selection for disaster roaming, according to some embodiments of the disclosure. As a convenience and not a limitation, method 400, can be described with elements of FIGS. 1-3. For example, method 400 can be performed by UE 110 or UE 115 of FIG. 1, or processor 210 of system 200 of FIG. 2 that executes instructions such as application 254 stored in memory 250. UE 110 can present the home PLMN, UE 110 preferred PLMN list (e.g., can include a user controlled preferred list and/or an operator controlled preferred list), and a forbidden PLMN list. When a disaster occurs, one or more forbidden PLMNs from the forbidden PLMN list can become available to offer disaster roaming service. UE 110 can designate and present one or more forbidden PLMNs as providing disaster roaming service. For example, application 254 in memory 250 of system 200 can present a forbidden PLMN as a designated disaster roaming PLMN by suppressing the forbidden status indication, or indicating that the forbidden PLMN is available and offering disaster roaming (e.g., accepting subscribers temporarily due to disaster roaming.)

In method 400, when a disaster occurs one or more forbidden PLMNs from the forbidden PLMN list can become available to offer disaster roaming, and a user can make a selection accordingly via UE 110. In method 400, UE 110 is configured as follows: UE 110's home PLMN is home PLMN L 120. UE 110's preferred PLMN list includes the ordered pair {PLMN A, PLMN B}. The preferred PLMN list can include two lists: User controlled PLMN selector list and operator controlled PLMN selector list (3GPP TS 23.122 Sec 4.4.3.1.2). UE 110 searches for a PLMN in the priority order: PLMN L 120, PLMN A, PLMN B. UE 110's forbidden PLMN List includes {PLMN X, PLMN Y 130, PLMN Z, PLMN S, PLMN T, PLMN U}. A service agreement between operators allows forbidden PLMN X to provide disaster roaming service for wireless devices subscribed for service in the home PLMN, PLMN L 120, in the event PLMN L 120 is not available. In addition, operators also have established service agreements that allow: PLMN Y to provide disaster roaming for wireless devices operating in PLMN Z); PLMN S to provide disaster roaming for wireless devices operating in PLMN A; and PLMN T can provide disaster roaming service for wireless devices operating in PLMN U. In some embodiments a service agreement may be reciprocal.

At 410, UE 110 performs a search for a PLMN.

At 420, UE 110 receives an indication from a forbidden PLMN (e.g., PLMN X, PLMN Y 130, PLMN Z, PLMN S, PLMN T, PLMN U) of a forbidden PLMN list of UE 110 identifying a first PLMN for which the forbidden PLMN is offering disaster roaming service for UEs associated with the first PLMN.

At 430, UE 110 determines whether the first PLMN is the home PLMN. When UE 110 is in the home country, UE 110 determines whether the first PLMN is the home PLMN (e.g., PLMN L 120.) If the first PLMN is PLMN L 120, then the forbidden PLMN is offering disaster roaming service for subscribers of PLMN L 120 and method 400 proceeds to 450. When the first PLMN is not the home PLMN (e.g., PLMN L 120), method 400 proceeds to 440.

At 440, when the first PLMN is not the home PLMN, UE 110 determines whether the first PLMN is not in a forbidden PLMN list of the user equipment (UE) or not in a fifth generation system (5GS) forbidden tracking areas for roaming list. When the first PLMN is not in either the forbidden list or a 5GS forbidden tracking areas for roaming list, (e.g., PLMN A) UE 110 can be roaming and the forbidden PLMN can provide disaster recovery service for UE 110. Method 400 proceeds to 450.

For example, if the first PLMN is PLMN Z or PLMN U that are in UE 110's forbidden list, then the forbidden PLMN cannot provide disaster roaming service for UE 110 and method 400 returns to 410 to search for a PLMN. Even though operators may have service agreements for forbidden PLMN Y to provide disaster roaming service for wireless devices operating in PLMN Z, UE 110 and/or service agreements for forbidden PLMN T to provide disaster roaming service for wireless devices operating in PLMN U, forbidden PLMN Y and PLMN T cannot provide disaster roaming services for UE 110.

At 450, UE 110 sends indication information to upper layers (e.g., an application layer) of UE 110 to designate the forbidden PLMN as a disaster roaming PLMN for the first PLMN. In a home country example, the forbidden PLMN can be PLMN X that can be designated to provide disaster roaming for home PLMN L 120 subscribers like UE 110. In a roaming example, the forbidden PLMN can be PLMN S that can be designated to provide disaster roaming for wireless devices like UE 110 that operate in PLMN A.

At 460, UE 110 via the application layer, presents the forbidden PLMN (e.g., PLMN X or PLMN S) as a designated disaster roaming PLMN (e.g., PLMN X or PLMN S with the forbidden status indication suppressed, or displaying a designation that PLMN X or PLMN S is available and offering disaster roaming service.) Note that PLMN T and PLMN Y remain identified with forbidden status indication.

At 470, UE 110 receives an input selection of the designated disaster roaming PLMN (e.g., PLMN X or PLMN S.)

At 480, UE 110 establishes a communication with the designated disaster roaming PLMN (e.g., PLMN X or PLMN S.)

In a Public Network Integrated-Non-Public Network (PNI-NPN) a Closed Access Group (CAG) identifies a group of subscribers who are permitted to access one or more CAG cells associated with the CAG. For example, a gNB can provide 5GS service to a location-specific factory whose UE devices or Internet of Things (IoT) devices communicate via a CAG-only cell. The CAG-only cell prevents others from accessing and/or communicating with the location-specific factory devices (e.g., for security, privacy.) A CAG-only cell is identified by a CAG identifier broadcast in a system information broadcast (SIB1) message. A CAG-only cell will have its cellReservedforOtherUse field set to True to prevent non-member UEs from selecting the cell. A CAG-capable UE (e.g., UE 115) can be configured with the following per PLMN (clause 5.30.3.3 of 3GPP TS 23.501 [3]) an Allowed CAG list containing the CAG identifiers which the UE is allowed to access; and an indication if the UE is only allowed to access 5GS via CAG cells. For example, gNB 127 of FIG. 1 can provide 5GS wireless service to a CAG-capable device such as UE 115 via a CAG-only cell. Some embodiments enable a CAG-only cell as well as a 5GS cell (e.g., gNB 145) to offer disaster roaming service to CAG-only UE devices.

Figure 5:
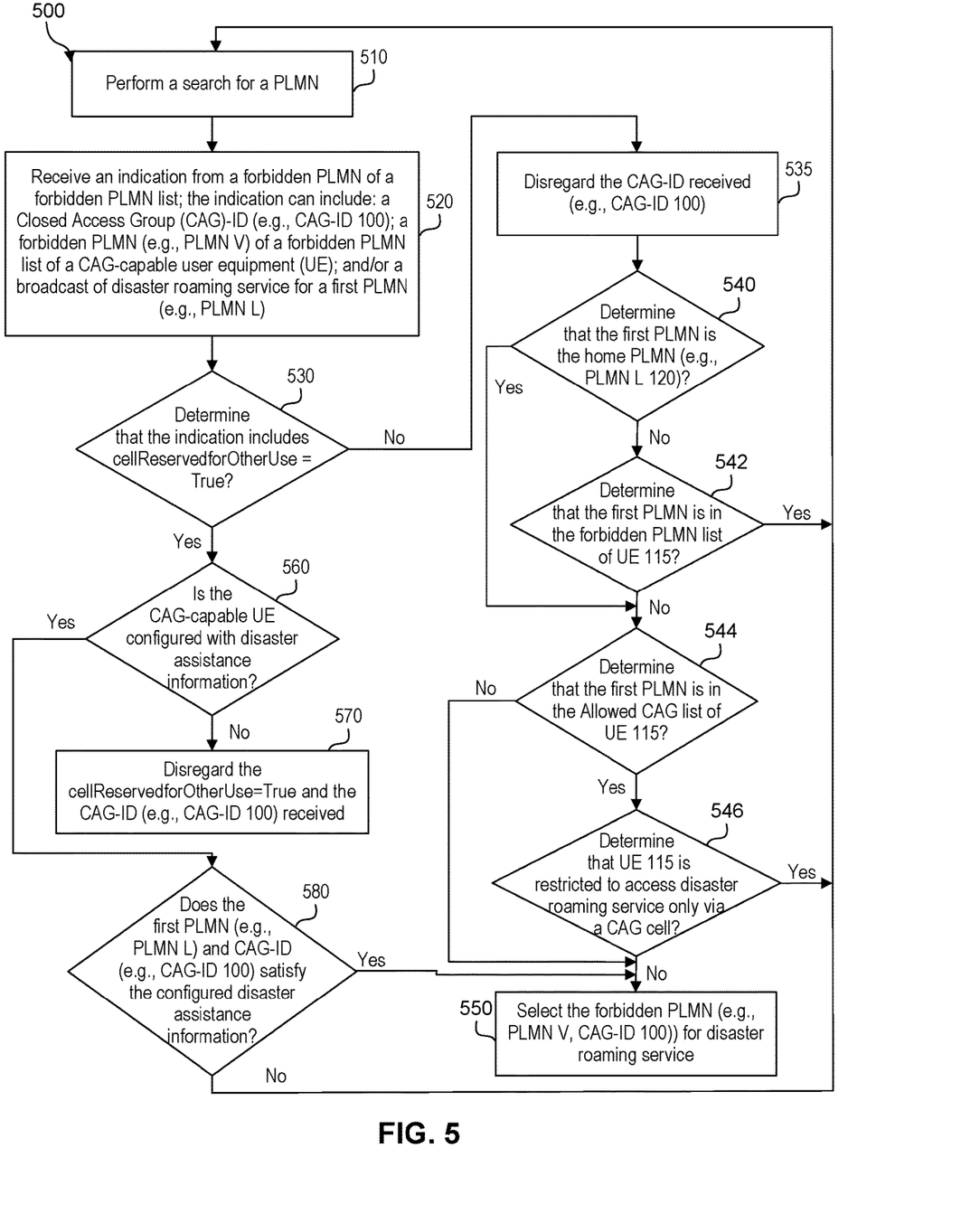
FIG. 5 illustrates an example method for a Closed Group Access (CAG)-capable UE supporting PLMN selection for disaster roaming, according to some embodiments of the disclosure.

FIG. 5 illustrates method 500 for a CAG-capable UE supporting PLMN selection for disaster roaming, according to some embodiments of the disclosure. As a convenience and not a limitation, method 500, can be described with elements of FIGS. 1-4. For example, method 500 can be performed by UE 115 of FIG. 1, or processor 210 of system 200 of FIG. 2 that executes instructions such as application 254 stored in memory 250.

In method 500, CAG-Capable UE 115 can be configured with home PLMN as PLMN L 120 with an Allowed CAG list: {PLMN L-CAG-ID 1, CAG-ID 2} {PLMN A-CAG-ID 11, CAG-ID 22}. In addition, UE 115 has a forbidden PLMN List: {PLMN V, PLMN Y, PLMN Z}. A service agreement between operators allow forbidden PLMN V 140 to provide disaster roaming service for CAG-capable wireless devices subscribed for service in the home PLMN, PLMN L 120, in the event PLMN L 120 is not available. Forbidden PLMN V 140 transmits a message or indication that includes for example: PLMN V, CAG-ID 100, cellReservedforOtherUse=True, and broadcasts disaster roaming for PLMN L 120.

At 510, UE 115 performs a search for a PLMN (e.g., when PLMN L 120 is not available.)

At 520, UE 115 receives an indication from a forbidden PLMN (e.g., PLMN V) of a forbidden PLMN list; the indication (e.g., message) can include: a CAG-ID (e.g., CAG-ID 100); a forbidden PLMN (e.g., PLMN V) of a forbidden PLMN list of CAG-capable UE 115; and/or a broadcast of disaster roaming service for a first PLMN (e.g., PLMN L).

At 530, UE 115 determines whether the indication is received from a CAG-only cell. For example, UE 115 determines whether the indication includes cellReservedforOtherUse=True. When the value is True, method 500 proceeds to 560. When the value is False, method 500 proceeds to 535.

At 535, the indication is received via a 5GS cell that is not a CAG-only cell (e.g., the system information field cellReservedforOtherUse=False.) Thus, UE 115 disregards the CAG-ID field (e.g., CAG-ID 100) received in the indication.

At 540, UE 115 determines whether the first PLMN (e.g., PLMN L 120) is the home PLMN. When the first PLMN is the home PLMN, method 500 proceeds to 544. When the first PLMN is not the home PLMN, method 500 proceeds to 542.

At 542, UE 115 determines whether the first PLMN is in the forbidden PLMN list of UE 115. When the first PLMN is in the forbidden PLMN list of UE 115, the forbidden PLMN (e.g., PLMN V 140) cannot provide disaster roaming service for UE 115. Thus, method 500 returns to 510 to search for a PLMN. Otherwise, method 500 proceeds to 544.

At 544, UE 115 determines whether the first PLMN is in the Allowed CAG list of UE 115. When the first PLMN is in the Allowed CAG list, method 500 proceeds to 546. Otherwise, method 500 proceeds to 550.

At 546, UE 115 determines whether UE 115 is restricted to access disaster roaming service in the first PLMN only via a CAG cell. When UE 115 is restricted to access disaster roaming service in the first PLMN only via a CAG cell, (e.g., UE 115 is configured with an indication that for the first PLMN, UE 115 is only allowed to access 5GS via CAG cells) method 500 proceeds to 510. When UE 115 is not restricted to access disaster roaming service in the first PLMN only via a CAG cell, method 500 proceeds to 550.

At 550, UE 115 selects the forbidden PLMN (e.g., PLMN V, CAG-ID 100)) for disaster roaming service.

At 560, where cellReservedforOtherUse=True, a determination is made whether CAG-capable UE 115 is configured with disaster assistance information (e.g., stored in memory 250 of system 200.) When UE 115 is configured with disaster assistance information, method 500 proceeds to 580. When UE 115 is not configured with disaster assistance information, method 500 proceeds to 570.

At 570, UE 115 disregards the cellReservedforOtherUse=True and the CAG-ID (e.g., CAG-ID 100) received in the indication. Thus, CAG-capable UE 115 may be able to access disaster roaming service offered via CAG-ID 100 of PLMN V 140 via gNB 145 even though CAG-ID 100 is not in the Allowed CAG list of UE 115. Method 500 returns to 540 to verify that the first PLMN is the home PLMN or not in the forbidden PLMN list of UE 115.

At 580, UE 115 determines whether the first PLMN (e.g., PLMN L 120) and CAG-ID (e.g., CAG-ID 100) received in the indication satisfy the configured disaster assistance information. UE 115 can only utilize the forbidden PLMN when the disaster assistance information substantially matches the data received in the indication. When the first PLMN and the CAG-ID received in the indication satisfies (e.g., substantially matches) the disaster assistance information stored, method 500 returns to 550 to select the forbidden PLMN for disaster roaming service. Otherwise, method 500 returns to 510 to search for a PLMN.

Figure 6:
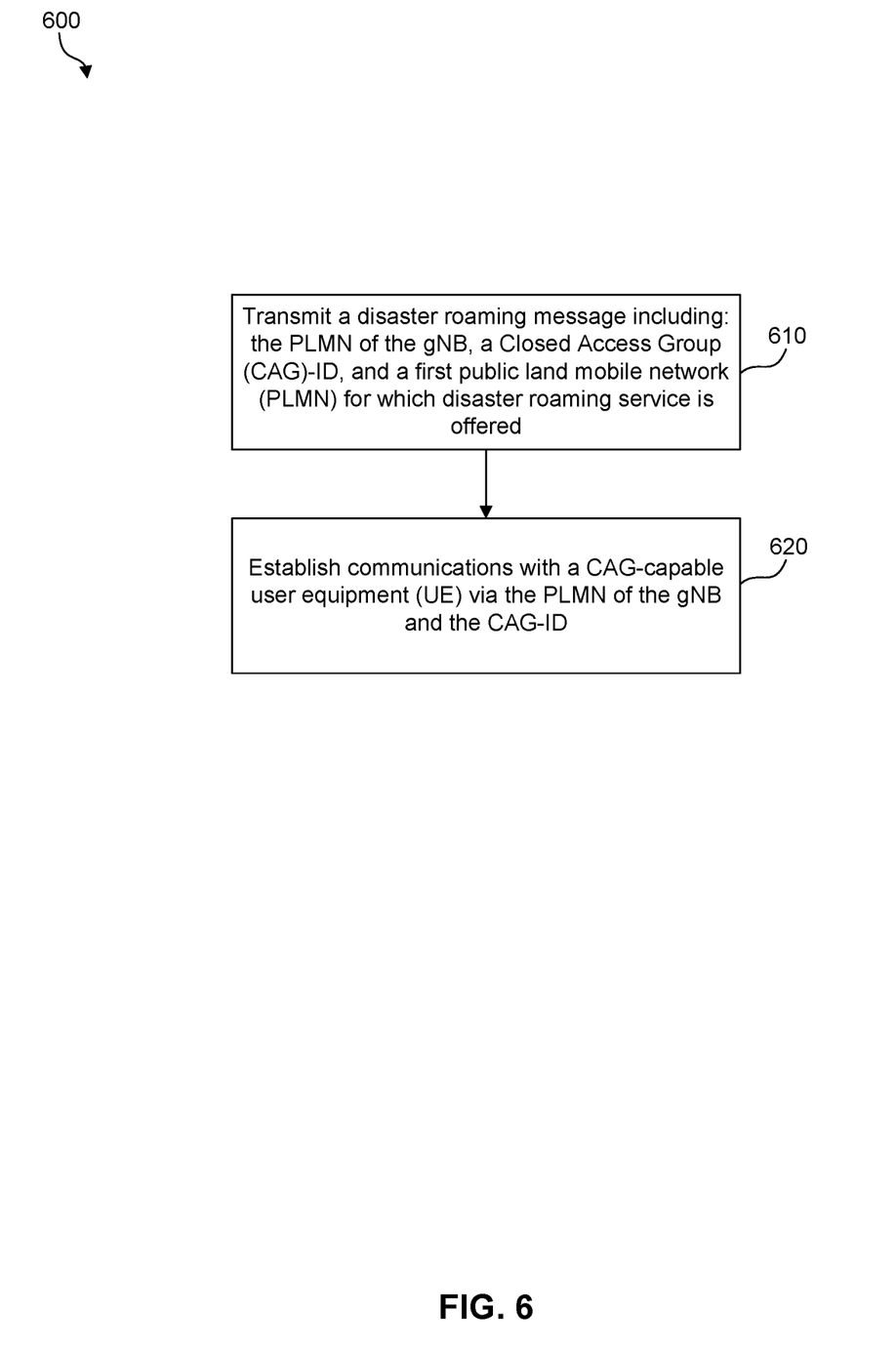
FIG. 6 illustrates an example method for a 5G Node B (gNB) that can provide wireless service via a Closed Group Access (CAG) cell, supporting PLMN selection for disaster roaming, according to some embodiments of the disclosure.

FIG. 6 illustrates method 600 for a gNB that can provide wireless service via a CAG cell, supporting PLMN selection for disaster roaming, according to some embodiments of the disclosure. As a convenience and not a limitation, method 600, can be described with elements of FIGS. 1-5. For example, method 600 can be performed by gNB 145 or gNB 135 of FIG. 1, or processor 210 of system 200 of FIG. 2 that executes instructions such as application 254 stored in memory 250.

At 610, gNB 145 transmits a disaster roaming message including: the PLMN of the gNB (e.g., PLMN V 140), a CAG-ID (e.g., CAG-ID 100), and a first PLMN (e.g., PLMN L 120) for which disaster roaming service is offered.

At 620, gNB 145 establishes communications with a CAG-capable UE device (e.g., UE 115) via the PLMN of the gNB (e.g., PLMN V) and the CAG-ID (e.g., CAG-ID 100.)

Figure 7:
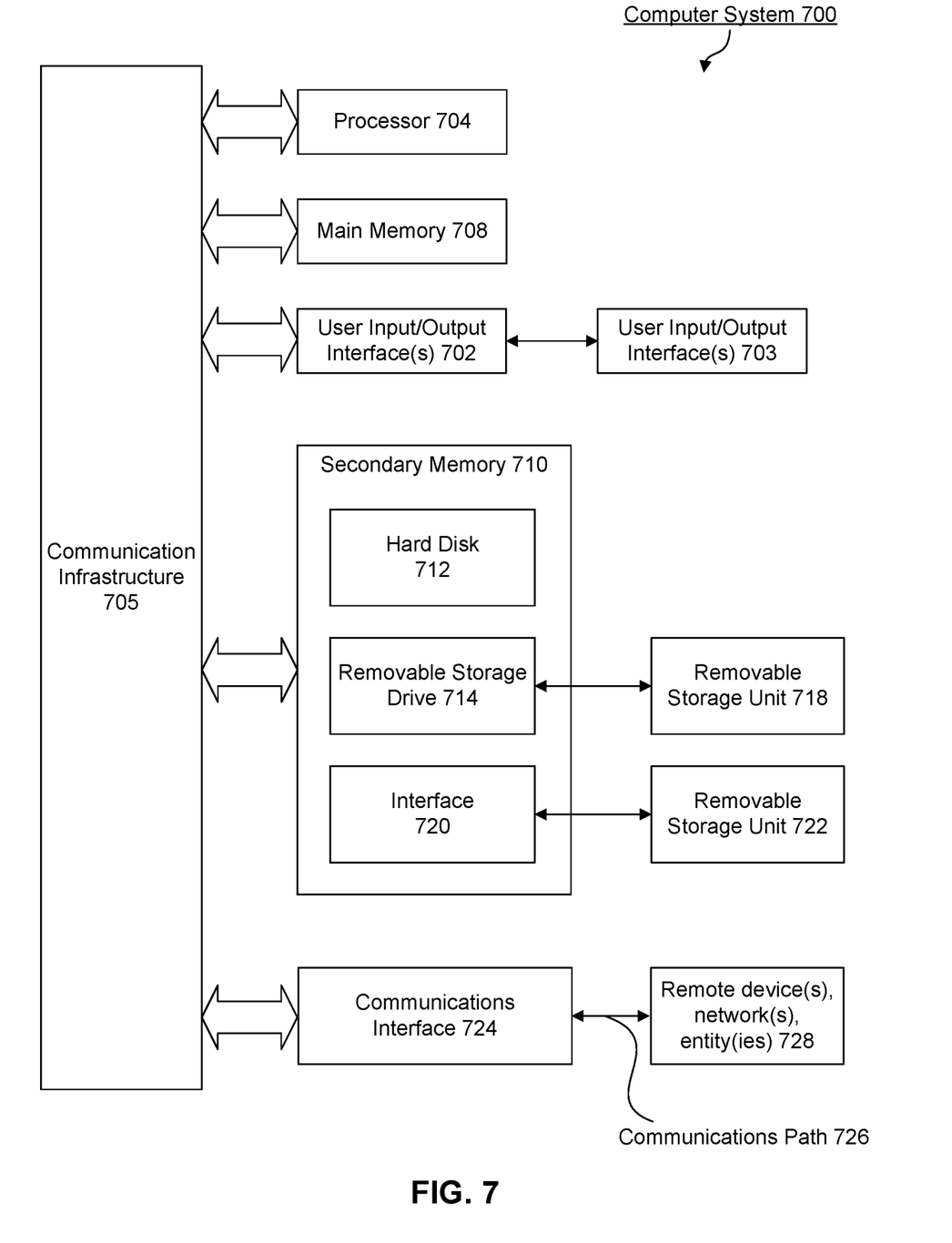
FIG. 7 is an example computer system for implementing some embodiments or portion(s) thereof.

Various embodiments can be implemented, for example, using one or more well-known computer systems, such as computer system 700 shown in FIG. 7. Computer system 700 can be any well-known computer capable of performing the functions described herein. For example, and without limitation, system 200 of FIG. 2, 300 of FIG. 3, method 400 of FIG. 4, method 500 of FIG. 5, and method 600 of FIG. 6 (and/or other apparatuses and/or components shown in the figures) may be implemented using computer system 700, or portions thereof.

Computer system 700 includes one or more processors (also called central processing units, or CPUs), such as a processor 704. Processor 704 is connected to a communication infrastructure 706 that can be a bus. One or more processors 704 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 also includes user input/output device(s) 703, such as monitors, keyboards, pointing devices, etc., that communicate with communication infrastructure 706 through user input/output interface(s) 702. Computer system 700 also includes a main or primary memory 708, such as random access memory (RAM). Main memory 708 may include one or more levels of cache. Main memory 708 has stored therein control logic (e.g., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 includes a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 reads from and/or writes to removable storage unit 718 in a well-known manner.

According to some embodiments, secondary memory 710 may include other means, instrumentalities or other approaches for allowing computer programs and/or other instructions and/or data to be accessed by computer system 700. Such means, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 enables computer system 700 to communicate and interact with any combination of remote devices, remote networks, remote entities, etc. (individually and collectively referenced by reference number 728). For example, communication interface 724 may allow computer system 700 to communicate with remote devices 728 over communications path 726, which may be wired and/or wireless, and which may include any combination of LANs, WANs, the Internet, etc. Control logic and/or data may be transmitted to and from computer system 700 via communication path 726.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 700, main memory 708, secondary memory 710 and removable storage units 718 and 722, as well as tangible articles of manufacture embodying any combination of the foregoing. Such control logic, when executed by one or more data processing devices (such as computer system 700), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 7. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A non-transitory computer-readable medium storing instructions that, when executed by a processor of an electronic device, cause the electronic device to perform operations, the operations comprising:
   receiving, from a first forbidden public land mobile network (PLMN) of a forbidden PLMN list of the electronic device, a first message that a disaster roaming service is offered for electronic devices associated with a first PLMN;
   determining based at least on the first message, that the first PLMN corresponds to a home PLMN of the electronic device;

sending first message information to upper layers of the electronic device; and subsequent to the sending, presenting the first forbidden PLMN as a first designated disaster roaming PLMN by suppressing a forbidden status indication of the first forbidden PLMN;

receiving, from a second forbidden PLMN of the forbidden PLMN list of the electronic device, a second message that the disaster roaming service is offered for electronic devices associated with a third PLMN;

sending second message information to the upper layers; and presenting the second forbidden PLMN as a second designated disaster roaming PLMN.

2. The non-transitory computer-readable medium of claim 1, wherein the presenting the first forbidden PLMN comprises:

displaying the first forbidden PLMN as being available for the disaster roaming service.

3. The non-transitory computer-readable medium of claim 1, further comprising:

receiving a selection of the first designated disaster roaming PLMN; and establishing communications with the first designated disaster roaming PLMN.

4. The non-transitory computer-readable medium of claim 1, the operations further comprising: determining based at least on the second message, that the third PLMN is not: the home PLMN; in the forbidden PLMN list; or in a wireless system forbidden tracking area.

5. The non-transitory computer-readable medium of claim 1, wherein the presenting the second forbidden PLMN as the second designated disaster roaming PLMN comprises suppressing a forbidden status indication of the second forbidden PLMN.

6. The non-transitory computer-readable medium of claim 1, wherein the presenting the second forbidden PLMN as the second designated disaster roaming PLMN comprises displaying the second forbidden PLMN as being available for the disaster roaming service.

7. A method for an electronic device, comprising:

receiving, from a first forbidden public land mobile network (PLMN) of a forbidden PLMN list of the electronic device, a first message that a disaster roaming service is offered for electronic devices associated with a first PLMN;

determining, based at least on the first message, that the first PLMN corresponds to a home PLMN of the electronic device;

sending first message information to upper layers of the electronic device;

subsequent to the sending, presenting the first forbidden PLMN as a first designated disaster roaming PLMN by suppressing a forbidden status indication of the first forbidden PLMN;

receiving, from a second forbidden PLMN of the forbidden PLMN list of the electronic device, a second message that the disaster roaming service is offered for electronic devices associated with a third PLMN;

sending second message information to the upper layers; and presenting the second forbidden PLMN as a second designated disaster roaming PLMN.

8. The method of claim 7, wherein the presenting the first forbidden PLMN comprises:

displaying the first forbidden PLMN as being available for the disaster roaming service.

9. The method of claim 7, further comprising:

receiving a selection of the first designated disaster roaming PLMN; and establishing communications with the first designated disaster roaming PLMN.

10. The method of claim 7, further comprising: determining, based at least on the second message, that the third PLMN is not: the home PLMN; in the forbidden PLMN list; or in a wireless system forbidden tracking area.

11. The method of claim 7, wherein the presenting the second forbidden PLMN as the second designated disaster roaming PLMN comprises suppressing a forbidden status indication of the second forbidden PLMN.

12. The method of claim 7, wherein the presenting the second forbidden PLMN as the second designated disaster roaming PLMN comprises displaying the second forbidden PLMN as being available for the disaster roaming service.

13. An electronic device, comprising:

a memory; and a processor communicatively coupled to the memory, configured to:

receive, from a first forbidden public land mobile network (PLMN) of a forbidden PLMN list of the electronic device, a first message that a disaster roaming service is offered for electronic devices associated with a first PLMN;

determine, based at least on the first message, that the first PLMN corresponds to a home PLMN of the electronic device;

send first message information to upper layers of the electronic device;

subsequent to the sending, present the first forbidden PLMN as a first designated disaster roaming PLMN by suppressing a forbidden status indication of the first forbidden PLMN;

receive, from a second forbidden PLMN of the forbidden PLMN list of the electronic device, a second message that the disaster roaming service is offered for electronic devices associated with a third PLMN;

send second message information to the upper layers; and present the second forbidden PLMN as a second designated disaster roaming PLMN.

14. The electronic device of claim 13, wherein to present the first forbidden PLMN, the processor is further configured to:

display the first forbidden PLMN as being available for the disaster roaming service.

15. The electronic device of claim 13, wherein the processor is further configured to:

receive a selection of the first designated disaster roaming PLMN; and establish communications with the first designated disaster roaming PLMN.

16. The electronic device of claim 13, wherein the processor is further configured to: determine, based at least on the second message, that the third PLMN is not: the home PLMN; in the forbidden PLMN list; or in a wireless system forbidden tracking area.

17. The electronic device of claim 13, wherein to present the second forbidden PLMN as the second designated disaster roaming PLMN, the processor is further configured to suppress a forbidden status indication of the second forbidden PLMN.

18. The electronic device of claim 13, wherein to present the second forbidden PLMN as the second designated disaster roaming PLMN, the processor is further configured to display the second forbidden PLMN as being available for the disaster roaming service.

\* \* \* \* \*